United States Patent [19]
Zimmerman

[11] 3,881,386
[45] May 6, 1975

[54] HACK SAW MITER BOX
[76] Inventor: Joseph E. Zimmerman, 701 S.E. Port, Lincoln City, Oreg. 97367
[22] Filed: Feb. 7, 1974
[21] Appl. No.: 440,310

[52] U.S. Cl. .................. 83/762; 83/647; 83/783
[51] Int. Cl. ..................... B27g 19/02; B27b 5/02
[58] Field of Search ........................ 83/761–766, 83/783, 778, 647

[56] References Cited
UNITED STATES PATENTS
| | | | |
|---|---|---|---|
| 369,770 | 9/1887 | Brewster et al. | 83/763 |
| 999,769 | 8/1911 | Fish | 83/763 |

*Primary Examiner*—Willie G. Abercrombie

[57] ABSTRACT

A specially designed supporting device for a hack saw, the supporting device being either independently used or in conjunction with a conventional miter box, the support device permitting a hack saw to cut accurately along an intended direction, the support device including a pair of guide carriers through which the hack saw is slideable during a sawing operation, each of the guide carriers being slideable along a pair of support rods which at their lower end are mounted upon a block of a carrier rod support.

3 Claims, 3 Drawing Figures

HACK SAW MITER BOX

This invention relates to generally miter boxes.

A principal object of the present invention is to provide a hack saw miter box for aiding a hack saw to be kept on an intended sawing course, the hack saw miter box being used either completely independently or in conjunction with a conventional miter box.

Another object of the present invention is to provide a hack saw miter box in which both hack saw frame as well as the hack saw blade are guided during the hack sawing operation.

Other objects of the present invention are to provide a hack saw miter box which is simple in design, inexpensive to manufacture, rugged in construction, easy to use and efficient in operation.

These and other objects will be readily evident upon a study of the following specification and the accompanying drawing, wherein.

Figure 1:
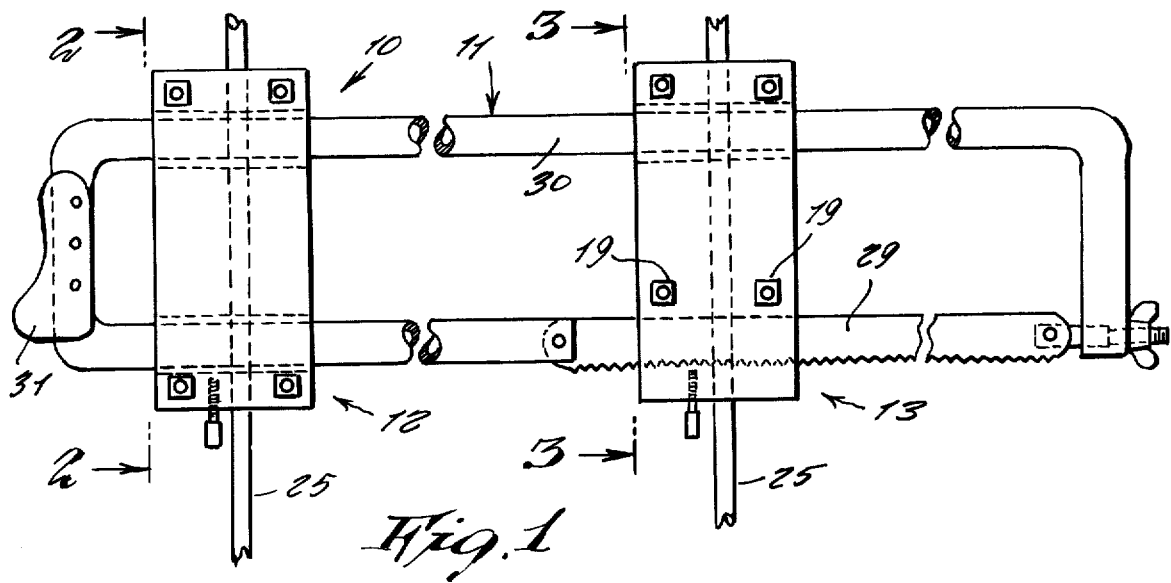
FIG. 1 is a side elevation view of the present invention.
Figure 2:
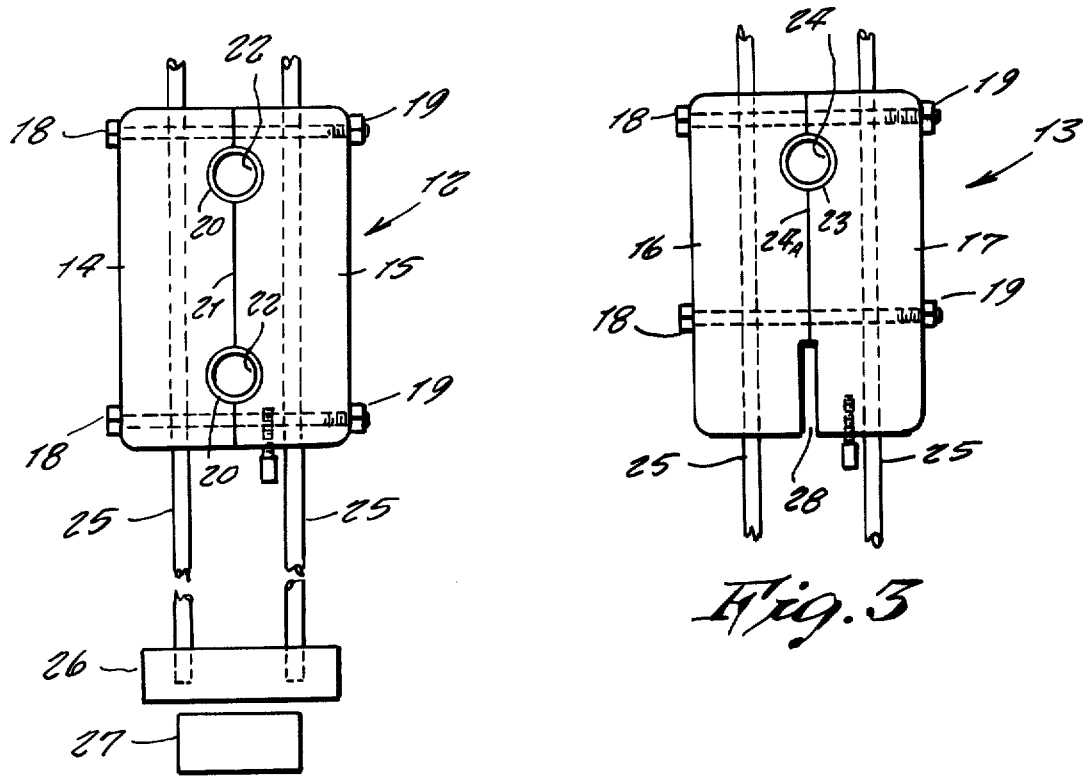
FIG. 2 is an end view as viewed in a direction 2—2 of FIG. 1.

Referring now to the drawing in detail, the reference numeral 10 represents a hack saw miter box according to the present invention which is used for accurately supporting a hack saw 11 during a sawing operation.

The hack saw miter box includes a pair of guide carriers 12 and 13 each one of which is comprised of a pair of blocks as shown at 14 and 15 and as shown at 16 and 17 respectively. Each of the pair of blocks are secured together by means of a plurality of transverse extending bolts 18 secured by a threaded nut 19.

The guide carrier 12 is provided with two transverse, circular openings 20 there through, the openings 20 being formed along a mating surfaces 21 of the two block 14 and 15. Into each of the openings 20 thus formed, a tubular bushion 22 is fitted which is thus clamped into position by means of the bolts 18 so that it is held securely between the blocks 14 and 15.

The guide carrier 13 has a transverse circular opening 23 formed along the mating surfaces 24 of the blocks 16 and 17, the opening 23 having a tubular sleeve 24 fitted therein which is accordingly clamped between the blocks by means of the bolt 18.

Each of the guide carriers 12 and 13 are slidable supported upon a pair of vertically extending support rods 25 which at their lower end are mounted in a block 26 that is bolted to a carrier rod support 27. Each one of the vertically extending support rods 25 extends through one of the guide carrier blocks, and the guide carrier accordingly is vertically slideable along the support rods.

Figure 3:
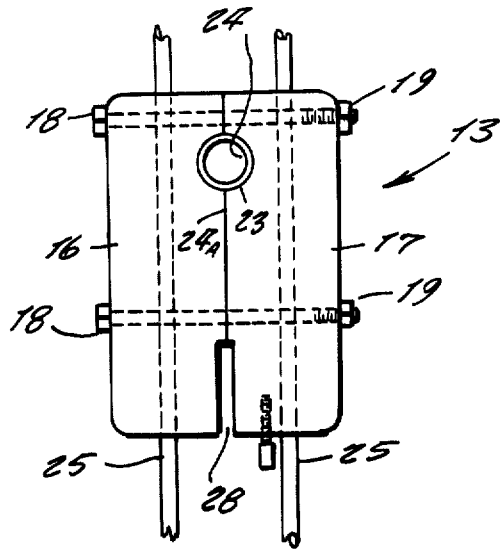
FIG. 3 is an end view taken in a direction 3—3 of FIG. 1.

While the guide carrier 12 is provided with two of the sleeves 22, the guide carrier 13 has only one of the tubular sleeves as shown at 24. Accordingly a lower end of the guide carrier 13 includes a vertical slot 28 that extents from a lower edge of guide carrier, the slot 26 extending upwardly along the mating surfaces 24 of the blocks, as is evident in FIG. 3 of the drawing. This slot 28 is for the purpose of slideably receiving a hack saw blade 29 of the hack saw 11.

The hack saw 11 includes a tubular hack saw frame 30 which is circular in cross section and which is of a size so to be receiveable within the tubular sleeves 22 and 24 of the guide carriers, as is shown in FIG. 1 of the drawing. The hack saw 11 also includes a handle 31 at one end for being grasped in a hand of a person operating the saw during a sawing operation. As shown in FIG. 1, it is to be noted that the tubular hack saw frame at one end includes an upper and lower tubular portion so to extend through both of the tubular sleeves 20 of the guide block 12. However the opposite end of the tubular hack saw frame includes only a tubular portion at an upper end which extends through the tubular sleeve 24 of guide carriers 13 while the hack saw blade extends through the slot 28 of the guide carrier.

In operative use, it is now evident that the hack saw is precisely supported for an accurate sawing operation by being slideably operated through the guide carriers 12 and 13, the guide carriers guiding both the upper and lower portions of the hack saw.

Thus there is provided a novel hack saw miter box which is used for making an accurate saw cut.

While various changes may be made in the detail construction, it is understood that such changes will be within the spirit and scope of the present invention as is defined by the appended claims.

What I now claim is:

1. In a hack saw miter box, the combination of a pair of guide carriers and a tubular hack saw for being slidably supported upon said guide carriers during a sawing operation, each of said guide carriers being comprised of a pair of blocks secured together by means of a bolt and nut means, a pair of tubular guide sleeves being clamped between one of said guide carriers while a singular tubular guide sleeve is clamped between said blocks of the other said guide carrier, each of said guide carriers being supported upon a pair of vertically extending, parallel, spaced apart support rods each one of which extends slidably free through each one of said blocks of each said guide carrier, said rods being longer than said blocks, and said rods at their lower ends being supported upon a rod support.

2. The combination as set forth in claim 1, wherein said other guide carrier also includes a vertically extending slot extending from a lower edge thereof, said slot being adaptable for guiding a hack saw blade of said hack saw.

3. The combination as set forth in claim 2, wherein said hack saw at one end includes an upper and lower tubular portion where as the other end of said hack saw includes only an upper tubular portion while said hack saw blade is at a lower portion thereof, said end of said hack saw having said upper and lower tubular portion being slideable within said guide carrier having said pair of tubular sleeves while the opposite end of said hack saw having said upper tubular portion and said hack saw blade are supported within said other guide carrier having said singular tubular sleeve and said slot.

* * * * *